Nov 1, 1949.  A. M. THOMSEN  2,486,582
METHOD OF GASIFYING CARBON AND THE LIKE
Filed Feb. 10, 1947
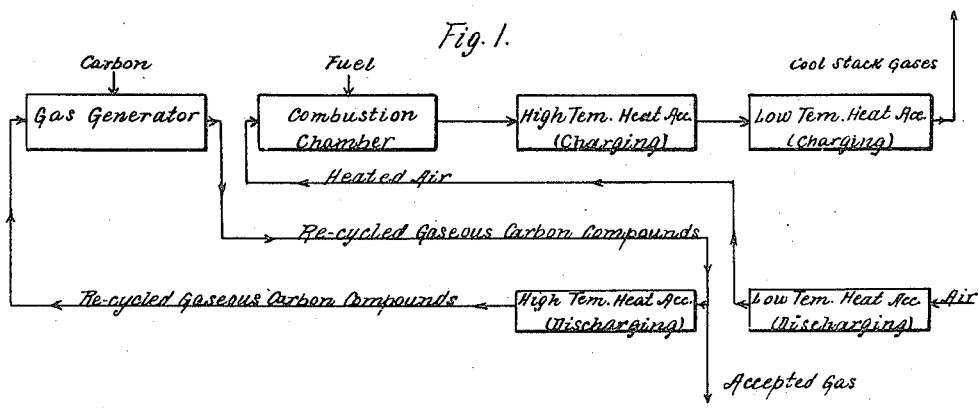
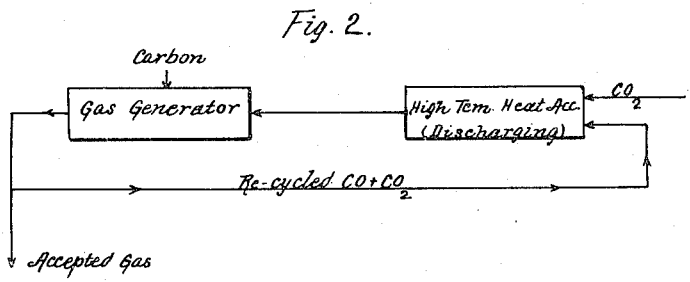
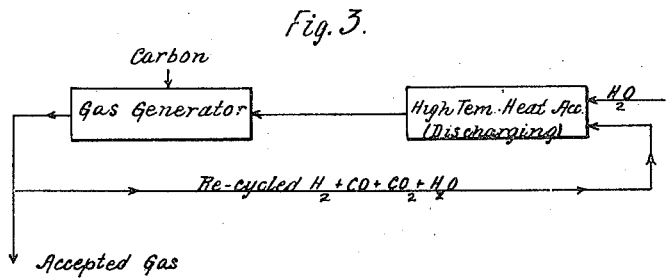
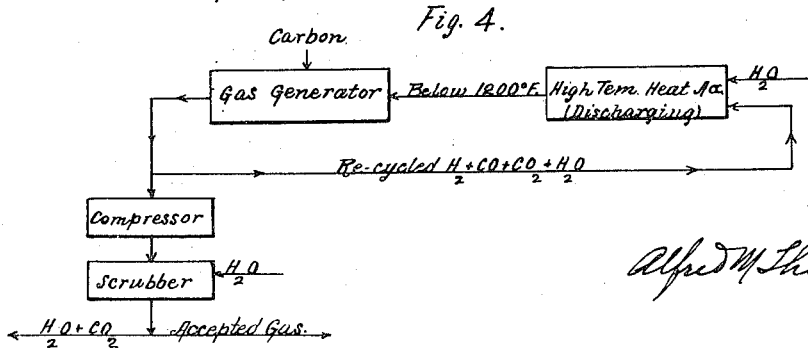
INVENTOR.
Alfred M Thomsen Patented Nov. 1, 1949

2,486,582

UNITED STATES PATENT OFFICE 2,486,582

METHOD OF GASIFYING CARBON AND THE LIKE

Alfred M. Thomsen, San Francisco, Calif.

Application February 10, 1947, Serial No. 727,671

5 Claims. (Cl. 48—204)

In the state of the art as it exists today gasifying carbon consists in converting it into any indefinite mixture of carbon monoxide, carbon dioxed, hydrogen, hydrocarbons, and nitrogen, the object being to convert the solid carbonaceous residue of most fuels into a combustible gas. In the strictest sense of the word the presence of hydrogen, save as a hydrocarbon, does not involve any gasification of resident solid carbon but is the result of the presence of water in the reacting substances, so said hydrogen appears rather as a replacement for carbon taking part in the reaction. Thus in the "water gas reaction" carbon and water combine to form carbon monoxide and hydrogen and the carbon is "gasified"; thus the hydrogen appears as a result of such gasification of the carbon, but not by conversion of carbon into hydrogen. When I use the term "gasification" it is to be construed in this larger commercial and economic sense and not as an academic restriction.

Furthermore, as all sources of carbon commercially available are very impure, it follows that all such impurities that are volatile become, perforce, constituents of said gas when manufactured. As all such matters are unavoidable I shall not further comment upon their presence or absence when definite reactions and their results are considered.

My process consists in general in the ways and means whereby the all essential heat energy is obtained and applied to the reacting substances. In the actual chemical reaction no contribution has been made. I avail myself of the reactions between carbon and carbon dioxide whereby carbon monoxide is obtained, of the water gas reaction previously referred to, and of the reaction between water and carbon which is the principal one at temperatures below 1200 degrees Fahrenheit where hydrogen and carbon dioxide are the principal products.

In its simplest form the reduction of carbon dioxide to carbon monoxide will serve as an illustration. The conventional equation is written as follows:

$$CO_2 + C = 2CO - 70{,}700 \text{ B. t. u.}$$

It is, of course, not a new thing to heat a gas indirectly by burning fuel and storing said heat in a refractory structure that being the system used in the heating of the blast of the high iron blast furnace, but by itself this would not serve my purpose. It is self-evident that if the $CO_2$ required were heated in this manner to say 2500° F. and then cooled to 1000° F. by the above heat absorbing reaction not as much as 20% of said $CO_2$ would be converted to CO.

I am not aware that it has ever been proposed to re-cycle the mixture of $CO_2$ and CO produced as above but it is evident that it could be done, CO and $CO_2$ having approximately the same specific heat and ultimately the resultant gas would consist solely of CO. However, the economics would be greatly against such an application of heat exchange for as the recycled gas is already at 1000°, the stove would require heating to at least 1200° at its coolest part which in turn would mean discharging the heating gases at 1400° F. or higher. Such use of fuel would be extremely wasteful and it is in the correction of this heat balance that my method is particularly helpful.

In the heating of a structure for the storing of heat and its subsequent transfer to a reacting gas, such as the blast furnace stove I have used in this illustration, I divide such a structure into two parts and in each part I perform a heat storing operation. As these parts are in series with one another the first part becomes heated to a relatively high temperature and the second part to a relatively low temperature with the gases escaping at low, conventional stack temperatures.

When heated to the desired temperature the structure is made to yield its stored heat in the following manner. The first or high temperature part is used to heat the reacting mixture of $CO_2$ and CO, the second part is used to preheat the air of combustion for the heating of the standby stove which is now taking its increment of heat in preparation for replacing the stove now being discharged. In order to work smoothly at least three and sometimes as many as four stoves would be in use simultaneously.

In this manner I obtain a high fuel efficiency in heating the stoves and the requisite high heat which alone is of value in activating the circulating gases in the gasification of solid carbon. Whenever a source of $CO_2$ is available this method is very convenient in converting said $CO_2$ into carbon monoxide.

From the viewpoint of heat value per volume equivalent there is but little difference between carbon monoxide and hydrogen, so as water is always convenient the water gas reaction will often be preferred. This reaction is as follows:

$$H_2O + C = CO + H_2 - 52{,}850 \text{ B. t. u.}$$

It will be seen that per unit of carbon involved the input of heat that will be furnished by heat exchange is considerably less than is the case in the previously described reaction. Finally, the low temperature reaction between carbon and water snows an even greater economy of heat transferred by heat interchange, thus:

$$2H_2O + C = CO_2 + 2H_2 - 35,000 \text{ B. t. u.}$$

It is, of course, axiomatic that all such gas reactions are incomplete so all cyclically returned gas can only be brought to that stage where equilibrium is established. At this point the accepted fraction of gas is split off, and to compensate an increment of additional $CO_2$ or water or both is added. In reaching said equilibrium the most dominating factor is the temperature of the reacting substances, in general, the higher the temperature the greater is the tendency to form CO at the expense of either carbon dioxide or of water.

The two-phase heat exchange is diagrammatically illustrated in the drawing under Fig. 1. The top line shows the heat accumulator receiving heat from a combustion chamber which generates its heat from fuel, aided by preheated air supplied by the low-temperature phase of the discharging heat accumulator represented by the second line. Said second line also shows recycled gas passing through the high-temperature phase of the discharging heat accumulator on its way to the generator where it encounters carbon, a fraction of said circulating gas being split off as an "accepted" portion.

In Figure 2, the two-phase feature is eliminated and only the high-temperature phase of the accumulator in the act of discharging is represented. It is assumed that said discharging accumulator has been heated in accordance with the technique represented in Fig. 1. Attention is thus focused upon the chemistry involved in the process. Recycled gas and $CO_2$ enter said accumulator and after reheating pass to the generator where carbon is encountered. After leaving said generator a portion of the gas is split off and the balance, consisting of a mixture of CO and $CO_2$, is recycled to the re-heating device. While not represented in the drawing it is self-evident that the "accepted fraction" can be stripped of its $CO_2$ by conventional means such as solution in water under pressure.

Fig. 3 is identical with Fig. 2, except in the substitution of water for $CO_2$ as the material reacting with carbon. The circulating gases thus become a mixture of water vapor, CO, $CO_2$, and $H_2$, from which an accepted portion is split off while additional water and carbon are supplied to the circuit. Manifestly, removal of excessive $CO_2$ from said accepted fraction by conventional means is an obvious device for increasing the heat value of the resultant gas.

Fig. 4 is identical with Fig. 3, but the limitation of less than 1200° F. is imposed as a condition of the gases before entering the generator and contacting solid carbon. Under such conditions the gas becomes very high in $CO_2$ but the input of heat introduced by heat interchange is correspondingly reduced to a minimum. However, such a large percentage of $CO_2$ will thus be produced that the removal of same from the accepted fraction becomes mandatory. In the drawing this is seen as accomplished by compression in the presence of water, the charged water being separated and caused to release its dissolved $CO_2$ by reduction of pressure. The use of such separated $CO_2$ in the gas making step in Fig. 2, will be self-evident.

My process may therefore be summarized as follows: Fuel is burned in air to produce heat and said heat is stored in a heat refractory structure. Said stored heat is then conveyed to a circulating flow of gas which is alternately heated by contact with said structure and cooled by converting solid carbon into some gaseous form. A portion of such circulating gas is split off from said circulating gas and may undergo further improvement by $CO_2$ removal. Compensation for such loss in volume in the circulating load is made by the addition of either $CO_2$ or water, or both. Greater heat economy is obtained by the use of a two phase heat recuperator, the stored heat of the high temperature phase being conveyed to the circulating gas load, while the low temperature phase heats the air of combustion for the fuel.

Inasmuch as all such gasification procedures are continuous only manipulative details can be given in a more precise illustration of my technique. Even these will be unnecessary to a man well familiar with the technique of heat recuperative furnaces. Thus it is self evident that the higher the temperature of both heating stove and resultant gas, the more efficient will be the gasification step. On the other hand, such temperature must not be allowed to reach the point where the stability of the structure becomes imperilled, nor must the variation of the "checkers" be so great as to induce surface spalling in the packing. In the case of Fig. 4, where heat must be kept below 1200° F., it is obvious that the temperature of the stove can be far higher, for only a part of the gas to be reheated need pass through the stove, an aliquot portion being by-passed. Manifestly, the generator must be refilled with carbon, and the condition of such carbon must be such as to permit passage of the gas.

Having thus fully described my process, I claim:

1. The method of gasifying carbon which comprises; burning fuel in air and storing the heat thus generated in a heat refractory structure; passing a circulating gaseous medium, consisting chiefly of CO and $CO_2$, alternately through said structure and through a body of carbon thus heating said gaseous medium by conveyance of heat from said refractory structure and cooling said medium by the reduction of $CO_2$ to CO incident to its passage through said body of carbon; splitting off a definite fraction of said circulating medium as accepted gas and compensating said circulating medium for such loss of volume by the addition of the corresponding volume of $CO_2$.

2. The method of gasifying carbon which comprises; burning fuel in air and storing the heat thus generated in a heat refractory structure having a high temperature and a low temperature section respectively, the low temperature section being heated by gases that have previously traversed the high temperature section; conveying the heat stored in said low temperature section to the air of combustion required by the fuel; passing a circulating gaseous medium, consisting chiefly of CO and $CO_2$, alternately through the high temperature section of said structure and through a body of carbon thus heating said gaseous medium by conveyance of heat from said refractory structure and cooling said medium by the reduction of $CO_2$ to CO incident to its passage through said body of carbon; splitting off a definite fraction of said circulating medium as accepted gas and compensating said circulating medium for such loss of volume by the addition of the corresponding volume of $CO_2$.

3. The method of gasifying carbon which comprises; burning fuel in air and storing the heat thus generated in a heat refractory structure having a high temperature and a low temperature section respectively, the low temperature section being heated by gases that have previously traversed the high temperature section; conveying the heat stored in said low temperature section to the air of combustion required by the fuel previously referred to; passing a circulating gaseous medium, consisting chiefly of CO, $CO_2$, $H_2$, and $H_2O$, alternately through the high temperature section of said structure and through a body of carbon thus heating the gaseous medium by conveyance of heat from said refractory structure and cooling said medium by the reduction of hydrogen and carbon oxides incident to the passage of said gaseous medium through said body of carbon; splitting off a definite fraction of said circulating medium as accepted gas and compensating said circulating medium for such loss of volume by the addition of the corresponding quantity of $H_2O$.

4. The method of gasifying carbon which comprises; burning fuel in air and storing the heat thus generated in a heat refractory structure; passing a circulating gaseous medium, consisting chiefly of CO, $CO_2$, $H_2$ and $H_2O$, alternately through said structure and through a body of carbon thus heating said circulating gaseous medium by conveyance of heat from said refractory structure and cooling said medium by the heat absorbing reaction between said carbon and the $H_2O$ and $CO_2$, resident in said gaseous medium, incident to the passage of said gaseous medium through said body of carbon; maintaining the temperature of said gaseous medium at temperatures below 1200° F. during its contact with said carbon; splitting off a definite fraction of said circulating medium as accepted gas and further purifying same by removal of the $CO_2$ resident therein; and compensating said circulating medium for such loss of volume by the addition of the corresponding amount of $H_2O$.

5. The method of gasifying carbon which comprises; burning fuel in air and storing the heat thus generated in a heat refractory structure having a high temperature and a low temperature section respectively, the low temperature section being heated by gases that have previously traversed the high temperature section; conveying the heat stored in said low temperature section to the air of combustion required by the fuel previously referred to; passing a circulating gaseous medium, consisting chiefly of CO, $CO_2$, $H_2$, and $H_2O$, alternately through the high temperature section of said structure and through a body of carbon thus heating the gaseous medium by conveyance of heat from said refractory structure and cooling said medium by the reaction between said carbon and the $H_2O$ and $CO_2$ resident in said gaseous medium, incident to the passage of said gaseous medium through said body of carbon; maintaining said gaseous medium at temperatures below 1200° F. during its contact with said carbon; splitting off a definite fraction of said circulating gaseous medium as accepted gas and further purifying same by the removal of the $CO_2$ resident therein; and compensating said circulating medium for such loss of volume by the addition of the corresponding amount of $H_2O$.

ALFRED M. THOMSEN.

REFERENCES CITED

The following references are of record in the file of this patent:

UNITED STATES PATENTS

| Number | Name | Date |
| --- | --- | --- |
| 1,791,411 | Hillebrand | Feb. 3, 1931 |